Figure 1:
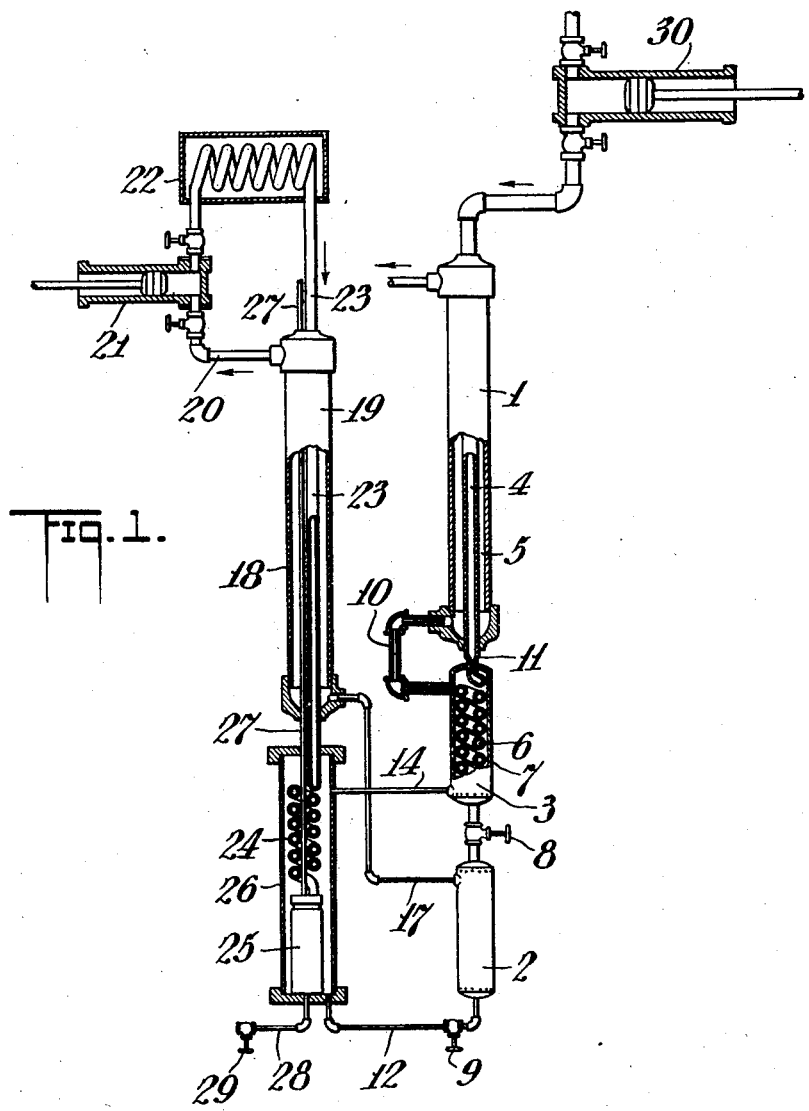

Sept. 1, 1931. R. R. BOTTOMS 1,821,540
PROCESS FOR THE EXTRACTION OF HELIUM FROM OTHER GASES CONTAINING THE SAME
Filed Sept. 28, 1928 2 Sheets-Sheet 1

INVENTOR
Robert Roger Bottoms
BY
Dean Fairbank Obreight & Hirsch
ATTORNEY

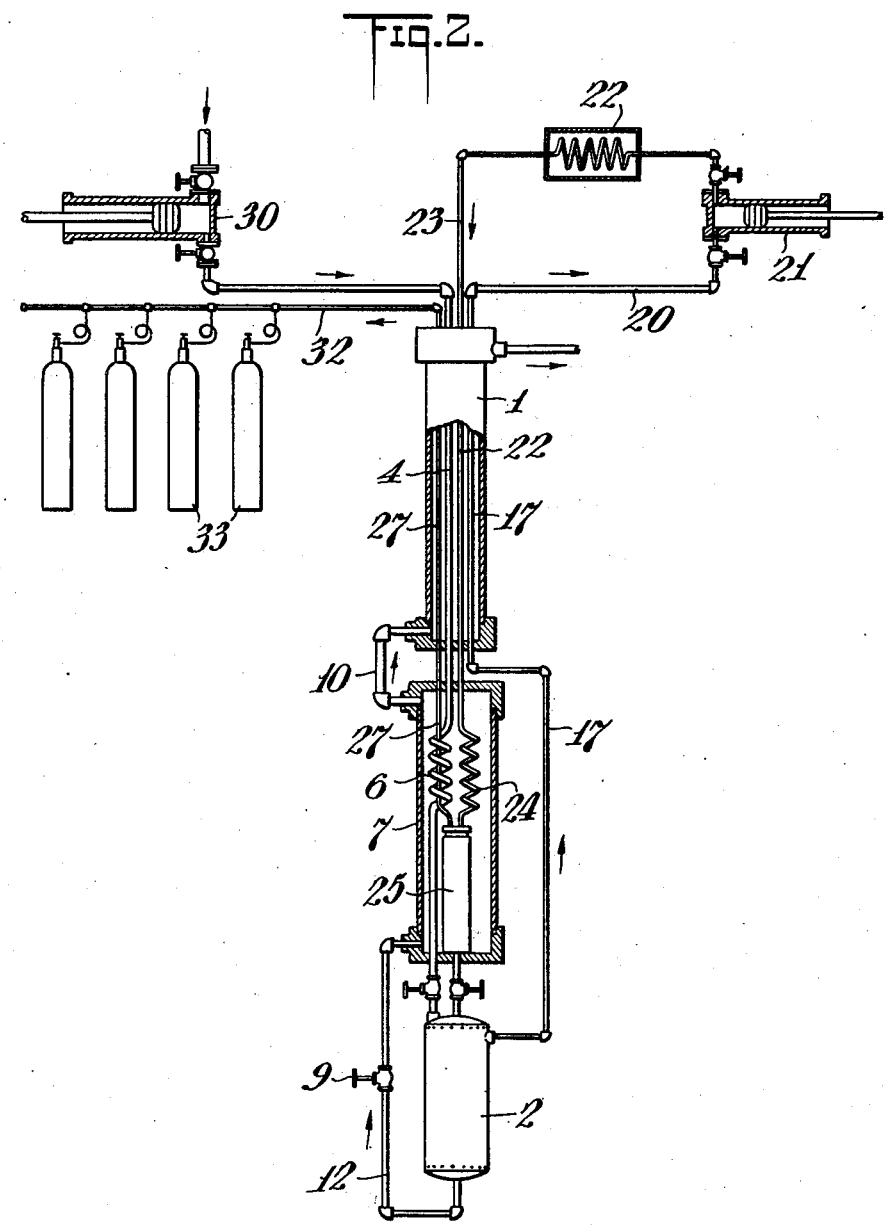

Patented Sept. 1, 1931

1,821,540

UNITED STATES PATENT OFFICE

ROBERT ROGER BOTTOMS, OF LOUISVILLE, KENTUCKY, ASSIGNOR TO THE HELIUM COMPANY, OF LOUISVILLE, KENTUCKY, A CORPORATION OF KENTUCKY

PROCESS FOR THE EXTRACTION OF HELIUM FROM OTHER GASES CONTAINING THE SAME

Application filed September 28, 1928. Serial No. 309,009.

This invention is an improvement on the process covered by my previous Patent No. 1,569,943, issued Jan. 19, 1926.

The main object of my invention is to provide certain improvements in the process of my prior patent, whereby substantially all of the helium may be obtained and of a high degree of purity.

In my previous process the gaseous mixture including the greater part of the helium is caused to liquefy under high pressure in a condenser and this liquid is delivered past a throttle valve to a liquid collecting pot where the dissolved helium is released. The liquid in this pot is delivered past a second throttle under low pressure where it evaporates to cool the condenser.

In my present invention the gas escaping from the liquid in the collecting pot and containing substantially all of the helium, is recompressed and the non-helium constituents reliquefied, the reliquefaction being accomplished by the liquid withdrawn from the liquid collecting pot of the main separating cycle. Thus the liquid from the pot of the liquefying cycle serves not only to cool and liquefy the raw gas, but also serves to cool and liquefy the recompressed helium-containing constitutent which had been taken off in gaseous form from the collecting pot. The helium separated from the liquid in the purifying cycle includes substantially all of the helium of the raw gas and is of far greater purity than that produced by the process of my prior patent.

In the accompanying drawings I have illustrated somewhat diagrammatically two types of apparatus which may be employed for carrying out my process.

It will be understood that in these drawings I have omitted showing heat insulation or lagging, control apparatus, and other parts which are usual and regular equipment of apparatus for liquefaction of gases.

In these drawings:

Fig. 1 is a drawing of an apparatus embodying substantially the same construction as is shown in my prior patent for effecting the liquefying cycle of the process, and with additional parts for purifying, and Fig. 2 shows a simplified form of apparatus in which the liquefying cycle and purifying cycle are combined in a single unit.

The construction shown in Fig. 1 is adapted for use where the purifying cycle is to be attached to a separate unit for effecting the liquefying cycle. This apparatus for the liquefied cycle is substantially the same as that shown in my prior patent.

The raw gas which is usually a natural gas containing in the neighborhood of two per cent of helium is first purified to remove carbon dioxide and water vapor. It is then delivered, under high pressure, which may be 40 to 200 atmospheres, more or less, for instance in the neighborhood of 2000 pounds, to a suitable countercurrent heat interchanger 1. This heat interchanger is connected to a condenser 3, and the latter is connected to a liquid receiving pot 2. The heat interchanger 1 has a passage 4 for the incoming raw gas and a passage 5 for the low pressure return gas.

The passage 4 is connected to a suitable pipe arrangement in the condenser 3 in which the gas is substantially completely liquefied at high pressure and carries the helium in solution. This pipe arrangement is shown as a coil 6.

The coil is disposed within a condenser tank 7 to which liquid under low pressure and freed of the helium is delivered as will hereinafter appear.

The lower end of the coil 6 is connected to the liquid collecting pot 2 by a pipe having a throttle valve 8 and liquid may be withdrawn from the bottom of the pot through a valve 9 and pipe 12.

The condenser pot 7 is connected to the passage 5 of the heat interchanger 1 by a pipe 10, while the passage 4 is connected to the coil 6 of the condenser by a pipe 11.

The construction so far described relates solely to the primary or liquefying cycle of the process.

The raw gas under high pressure delivered through the pipe 4 and liquefied in the coil 6 is conducted past the throttle valve 8 into the pot 2 at a pressure which may be in the neighborhood of 150 pounds, but I do not limit myself to this pressure since much lower or much higher pressures may be used. At this lower pressure the helium which has a far lower boiling point than the other constituents will separate from the liquid in the pot 2 and will escape through the pipe 17. The helium which has been dissolved in the liquid formed in the coil 6 will separate from the liquid which collected in the pot 2 and will also pass out through the pipe 17. The gas escaping from the pot through this pipe is the crude helium and may be 50% helium and 50% nitrogen or may be as much as 80% helium or even a larger per cent.

According to my prior patent the liquid withdrawn from the pot 2 and which contained the liquefied constituents of the natural gas was delivered directly to the condenser shell 7 where it evaporated to liquefy the high pressure raw gas. The gas resulting from this vaporization was then delivered through the passage 5 of the heat interchanger 1.

In my improved process the crude helium withdrawn from the collecting pot 2 is delivered by a pipe 17 to the outer passage 18 of a second interchanger 19. From the latter the crude helium is withdrawn through a pipe 20, recompressed to a suitable pressure, for instance 2000 pounds, in a compressor 21, the heat of compression is removed in a cooler 22 and the gas is returned to the interchanger 19 through a pipe 23. This pipe leads from the opposite end of the heat interchanger 19 to a condenser coil 24 and from there to a collecting pot 25. The condenser coil 24 and the collecting pot are within a chamber 26 which receives liquefied gas delivered from the first receiving pot 2 through the pipe 12. The upper end of this casing 26 is connected by a pipe 14 to the condenser casing 7 so that the liquid from the pot 2 instead of being delivered directly to the condenser 3 is delivered to the latter through the pipe 12, casing 26 and pipe 14, and in this portion of the circuit the non-helium constituents in the crude helium which has been recompressed is reliquefied. Gases evolved in the casing 26 pass out of said casing along with residual liquid through the pipe 14 to the condenser 3. Whether liquid alone or gas alone, or a mixture of liquid and gas passes through the pipe 14 depends upon the elevation of the inlet end of the pipe 14 in respect to the top of the casing 16. The character of the outgoing fluid depends upon the rate of delivery to the casing 26 and the rate of evaporation therein. In practice the pipe 14 serves to determine the liquid level in the casing 26.

The helium and nitrogen substantially completely separate by the partial liquefaction in the coil 24 and the evaporation in the pot 25 so that substantially all of the helium in a pure state may be drawn off in gaseous form from the pot 25 through a pipe 27 which leads through the heat interchanger 19. The liquid nitrogen may be drawn off from the pot 25 through the pipe 28 and valve 29.

I maintain the pot 2 at a pressure above that of the atmosphere, for instance approximately 100 pounds, so that the liquid at this pressure may drop to atmospheric pressure in passing the valve 9, and the crude helium may be delivered from the pipe 20 of the compressor at approximately 100 pounds pressure.

It will be noted that the process works in three ranges of pressure in the cycle for extracting crude helium. The high pressure is that necessary to give the required drop in temperature on expansion to maintain the low liquefaction temperature. The intermediate pressure is in the pot 2 and is held at any point convenient and necessary to give the required purity in the crude helium. The third pressure may be atmospheric or slightly above and gives the necessary refrigeration in the condenser. A very low temperature is maintained in order to obtain the maximum amount of heat of vaporization in the liquefied gas.

By means of my improved process I have been able to recover as high as 94% of the entire helium of the raw gas in pure condition.

It will be obvious that it is not essential that there be the two separate heat interchangers 1 and 19 and two separate condenser casings 7 and 26. A simple form of apparatus is shown in Fig. 2.

The raw gas from the compressor 30 and after the removal of the heat of compression is delivered through the pipe 4 in the heat interchanger 1, the coil 6 in the condenser casing 7 to the collecting pot 2. The liquid withdrawn from the bottom of this pot through the pipe 12 and past the valve 9 is delivered to the condenser casing 7 and vaporized gas is delivered from the pipe 10 to the heat interchanger, the crude helium from the pot 2 is delivered by the pipe 17 through the heat interchanger to the pipe 20, thence to the compressor 21, the cooler 22 and the pipe 23 which extends downwardly through the heat interchanger to the condenser coil 24 and delivered to the collecting pot 25. The pure helium from this pot escapes through the pipe 27 which leads through the heat interchanger. The pure helium which is still under high pressure generated by the compressor 21 may be delivered to a manifold 32 and thence to the storage cylinders 33.

As it is customary to ship the helium in cylinders under a pressure in the neighborhood of 2000 pounds it will be noted that in my improved process the compressor 21 serves not only for putting the crude helium under pressure to effect its purification, but permits the delivery of the pure helium directly from the apparatus to the storage cylinders without the necessity for further recompression. In other words the compressor 21 is ordinarily necessary in a construction for putting the gas into the storage cylinders, but in my improved process this compressor is so connected in the circuit that it recompresses not the pure helium, but the crude helium, and the pressure is maintained on the crude helium during its purification so that the pure helium as it comes from the purifying cycle is in condition for direct delivery to the storage cylinders.

It will be obvious that the apparatus as shown in Fig. 2 is very much simpler than that shown in Fig. 1, but it will also be apparent that the purifying portion of the apparatus shown in Fig. 1 may be constructed and used in connection with previously constructed liquefying apparatus such as shown in my prior patent, whereas the apparatus shown in Fig. 2 is designed for new installations.

It has the advantage of greater economy in manufacture, minimization of heat losses, and greater compactness and simplicity.

The apparatus employed for carrying out my improved process is disclosed and claimed in my copending divisional application Serial No. 546,244, filed June 23, 1931.

Having thus described my invention what I claim as new and desire to secure by Letters Patent is:

1. The method of separating helium from a gaseous mixture, including cooling the mixture by outgoing gases, liquefying the mixture in a condenser at high pressure, delivering the liquid to a receiver at lower pressure thereby separating crude helium in gaseous form from the residual liquid, delivering the residual liquid to a second receiver at a still lower pressure, recompressing the crude helium, cooling the recompressed crude helium by outgoing gases, liquefying the impurities of said crude helium at this recompression pressure thereby separating pure helium, and effecting both of said liquefying steps by the evaporation of said residual liquid at said still lower pressure and thereby producing said outgoing gases.

2. The method of separating helium from a gaseous mixture including compressing the mixture to high pressure, liquefying the mixture in a condenser at said high pressure, delivering the liquid to a receiver at lower pressure thereby separating crude helium in gaseous form from the residual liquid, delivering said residual liquid to a second receiver at substantially atmospheric pressure, recompressing said crude helium to a pressure suitable for commercial shipment of helium in cylinders, liquefying the impurities of said crude helium at said last mentioned pressure thereby separating pure helium under pressure, effecting both of said liquefying steps by the evaporation of said residual liquid at substantially atmospheric pressure, and delivering the pure helium at said last mentioned pressure directly to the storage cylinders.

3. The method of separating helium from a gaseous mixture including compressing the mixture to about 2000 pounds pressure, liquefying the mixture at said pressure, delivering the liquid to a separate receiver under a pressure of about 150 pounds thereby separating the crude helium in gaseous form from the residual liquid, recompressing crude helium to about 2000 pounds pressure, and liquefying the impurities of said crude helium at said last mentioned pressure, thereby separating pure helium under a pressure of about 2000 pounds.

4. The method of separating helium from a gaseous mixture including compressing the mixture to about 2000 pounds pressure, liquefying the mixture at said pressure, delivering the liquid to a separate receiver under a pressure of about 150 pounds thereby separating the crude helium in gaseous form from the residual liquid, recompressing crude helium to about 2000 pounds pressure, liquefying the impurities of said crude helium at said last mentioned pressure, thereby separating pure helium under a pressure of about 2000 pounds, and effecting both of said liquefying steps by the evaporation of said residual liquid at substantially atmospheric pressure.

5. The method of continuously separating and purifying helium which includes reducing to the liquid phase substantially all of the non-helium constituents of helium bearing gas at high pressure, reducing the pressure on said liquid to a lower value to release the crude helium from its solution in the other liquid constituents, delivering said liquid constituents to a still lower pressure, recompressing the crude helium from said second mentioned pressure to a high pressure, liquefying the impurities in the crude helium by thermal contact with the liquid constituents under lowest pressure, and withdrawing the purified helium in gaseous form at high pressure.

6. The method of continuously separating and purifying helium which includes reducing to the liquid phase substantially all of the non-helium constituents of helium bearing natural gas under high pressure, reducing the pressure on said liquid to a lower value to release the crude helium from its solution in the liquid constituents, further reducing the pressure on the liquid constituents and completely evaporating them, recompressing the crude helium from said second mentioned pressure to a higher pressure, liquefying the impurities of said crude helium by thermal contact with the liquid constituents at the third mentioned pressure, and withdrawing the purified helium in gaseous form at its recompression pressure.

7. The process of separating helium from a gaseous mixture including conducting the compressed gaseous mixture through one series of passages in a counter-current heat interchanger and thence into a condenser where the constituents of said gaseous mixture including a part of the helium present is reduced to liquid phase at high pressure, reducing the pressure by passing the resulting liquid through a throttle valve into a liquid collecting pot where the dissolved helium is released in impure form, recompressing the impure helium, withdrawing the liquid from said pot to a still lower pressure, liquefying the impurities from said impure helium under high pressure by the evaporation of a portion of the liquid withdrawn from said pot, evaporating the remainder of said liquid in said condenser in thermal contact with said gaseous mixture, and delivering the gases resulting from the evaporation of said liquid through another passage in said heat interchanger.

8. The process of separating helium from a gaseous mixture, including compressing the mixture to a high pressure, cooling the mixture while under said high pressure to effect liquefaction of the non-helium constituents of the mixture with at least a portion of the helium in solution therein, withdrawing the liquid, reducing the pressure thereon to an intermediate pressure to effect separation of crude helium mixture from the solution, recompressing said crude helium mixture, cooling it to effect separation into a liquid containing helium dissolved therein and free comparatively pure helium gas, withdrawing the helium gas, withdrawing said last mentioned liquid, reducing the pressure thereon to an intermediate pressure, adding said liquid to the first mentioned liquid whereby crude helium gases are separated therefrom, withdrawing the substantially helium free liquid, reducing the pressure thereof, and evaporating said liquid to effect both of said first mentioned cooling steps.

9. The process of separating helium from a gaseous mixture, including compressing the mixture to a high pressure, cooling the mixture while under said pressure to effect liquefaction of the non-helium constituents of the mixture with at least a portion of the helium in solution therein, withdrawing the liquid, reducing the pressure thereon to an intermediate pressure to effect separation of a crude helium mixture from the solution, recompressing said crude helium mixture, cooling it to effect separation into a liquid containing helium dissolved therein and free comparatively pure helium gas, withdrawing the helium gas, withdrawing said last mentioned liquid, reducing the pressure thereof to a low pressure, and evaporating said liquid at said low pressure to effect both of said cooling steps.

Signed at Louisville in the county of Jefferson and State of Kentucky this 24th day of September A. D. 1928.

ROBERT ROGER BOTTOMS.